United States Patent
Nigam et al.

(10) Patent No.: US 10,244,509 B2
(45) Date of Patent: Mar. 26, 2019

(54) SIMULTANEOUS TRANSMISSION AVOIDANCE METHOD AND APPARATUS OF UE IN WIRELESS COMMUNICATION SYSTEM SUPPORTING DUAL CONNECTIVITY

(71) Applicant: Samsung Electronics Co., Ltd., Gyeonggi-do (KR)

(72) Inventors: Anshuman Nigam, Karnataka (IN); Jungsoo Jung, Gyeonggi-do (KR); Sunheui Ryoo, Gyeonggi-do (KR); Jungmin Moon, Gyeonggi-do (KR); Sungjin Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 14/668,503

(22) Filed: Mar. 25, 2015

(65) Prior Publication Data

US 2015/0282150 A1  Oct. 1, 2015

(30) Foreign Application Priority Data

Mar. 25, 2014 (KR) .................. 10-2014-0034552

(51) Int. Cl.
*H04W 72/04* (2009.01)
*H04W 28/02* (2009.01)
(Continued)

(52) U.S. Cl.
CPC ... *H04W 72/0406* (2013.01); *H04W 28/0278* (2013.01); *H04B 7/2656* (2013.01);
(Continued)

(58) Field of Classification Search
None
See application file for complete search history.

(56) References Cited

U.S. PATENT DOCUMENTS 9,049,724 B2 * 6/2015 Dinan .................. H04B 7/2656
2013/0223298 A1 * 8/2013 Ahn ..................... H04B 7/2643
370/280
(Continued)

FOREIGN PATENT DOCUMENTS

EP 2636172 A2 9/2013
WO WO 2012/060660 A2 5/2012

OTHER PUBLICATIONS

Ericson, Uplink scheduling and BSRs with dual connectiviy, 2013.*

*Primary Examiner* — Vinncelas Louis

(57) ABSTRACT

A pre-5th-Generation (5G) or 5G communication system is provided for supporting higher data rates Beyond 4th-Generation (4G) communication system such as Long Term Evolution (LTE). Further, a simultaneous transmission avoidance method and apparatus of a terminal is provided for use in a wireless communication system supporting the dual connectivity. The Buffer Status Report (BSR) method of a terminal connected to a first and a second base station in a wireless communication system supporting a dual connectivity according to the present disclosure includes receiving an uplink resource allocation information from the first base station, generating an uplink allocation map information of the first base station based on the uplink resource allocation information, and transmitting, when BSR for the second base station is triggered, the uplink allocation map information of the first base station and the BSR for the second base station to the second base station.

22 Claims, 13 Drawing Sheets

(51) Int. Cl.
    *H04B 7/26*     (2006.01)
    *H04W 24/02*    (2009.01)
    *H04W 88/06*    (2009.01)

(52) U.S. Cl.
    CPC ........ *H04W 24/02* (2013.01); *H04W 72/0426* (2013.01); *H04W 88/06* (2013.01)

(56) References Cited

U.S. PATENT DOCUMENTS

| | | | |
|---|---|---|---|
| 2013/0315114 A1* | 11/2013 | Seo | H04L 5/001 370/280 |
| 2014/0293846 A1* | 10/2014 | Meng | H04L 5/1438 370/280 |
| 2014/0348105 A1* | 11/2014 | Rosa | H04W 72/1284 370/329 |
| 2015/0334737 A1* | 11/2015 | Susitaival | H04W 72/1284 370/329 |

* cited by examiner

SIMULTANEOUS TRANSMISSION AVOIDANCE METHOD AND APPARATUS OF UE IN WIRELESS COMMUNICATION SYSTEM SUPPORTING DUAL CONNECTIVITY

CROSS-REFERENCE TO RELATED APPLICATION AND CLAIM OF PRIORITY

The present application is related to and claims priority from and the benefit under 35 U.S.C. § 119(a) of Korean Patent Application No. 10-2014-0034552, filed on Mar. 25, 2014, which is hereby incorporated by reference for all purposes as if fully set forth herein.

TECHNICAL FIELD

The present disclosure relates to a wireless communication system and, in particular, to a simultaneous transmission avoidance method and apparatus of a terminal in a wireless communication system supporting the dual connectivity

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Also, mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

Meanwhile, dual connectivity is the operation where a given User Equipment (UE) connects to two evolved Node Bs (eNBs) for receiving a service. For example, the dual connectivity means that the UE connects a macro eNB and a small (pico) eNB that are responsible for different functions to receive a service.

The dual connectivity technology that is currently under discussion in the communication standardization organizations.

In the cellular communication system, most UEs are power-constrained and there is a need of a method for preventing a dual connectivity-enabled UE from performing simultaneous transmission to the two connected eNBs for the purpose of power control.

SUMMARY

To address the above-discussed deficiencies, it is a primary object to provide a simultaneous transmission avoidance method and apparatus that is capable of preventing a dual connectivity-enabled UE from performing simultaneous transmission to two connected eNBs for the purpose of power control of the UE in a wireless communication system supporting the dual connectivity.

Also, the present disclosure aims to provide a method and apparatus for adjusting, when the resource allocation changes for simultaneous transmission avoidance of the UE, Hybrid Automatic Repeat Request (HARQ) feedback timing in adaptation to the resource allocation change.

In accordance with various embodiments of the present disclosure, a Buffer Status Report (BSR) method of a terminal connected to a first and a second base station in a wireless communication system supporting a dual connectivity is provided. The BSR method includes receiving an uplink resource allocation information from the first base station, generating an uplink allocation map information of the first base station based on the uplink resource allocation information, and transmitting, when BSR for the second base station is triggered, the uplink allocation map information of the first base station and the BSR for the second base station to the second base station.

In accordance with another aspect of the present disclosure, a resource allocation method of a base station (second base station) in a wireless communication system supporting dual connectivity is provided. The resource allocation method includes receiving an uplink allocation map information of another base station (first base station) that is generated based on Buffer Status Report (BSR) for the second base station that is received from a terminal and information on uplink resources allocated to the terminal by the first eNB, allocating uplink resources to the terminal based on the uplink allocation map information, and transmitting the uplink resource allocation information to the terminal.

In accordance with another aspect of the present disclosure, a terminal of performing Buffer Status Report (BSR) that is connected to a first and a second base station in a wireless communication system supporting dual connectivity is provided. The terminal includes a transceiver that transmits and receives signals to and from the base stations and a controller that controls the transceiver to receive an uplink resource allocation information from the first base station, generates an uplink allocation map information of the first base station based on the uplink resource allocation information, and controls the transceiver to transmits, when BSR for the second base station is triggered, the uplink allocation map information of the first base station and the BSR for the second base station to the second base station.

In accordance with still another aspect of the present disclosure, a base station (second base station) of allocating resources to a terminal in a wireless communication system supporting dual connectivity is provided. The base station includes a transceiver that transmits and receives signals to and from the terminal and a controller that controls the transceiver to receive an uplink allocation map information of another base station (first base station) that is generated based on Buffer Status Report (BSR) for the second base station that is received from a terminal and information on uplink resources allocated to the terminal by the first eNB, allocates uplink resources to the terminal based on the uplink allocation map information, and controls the transceiver to transmit the uplink resource allocation information to the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
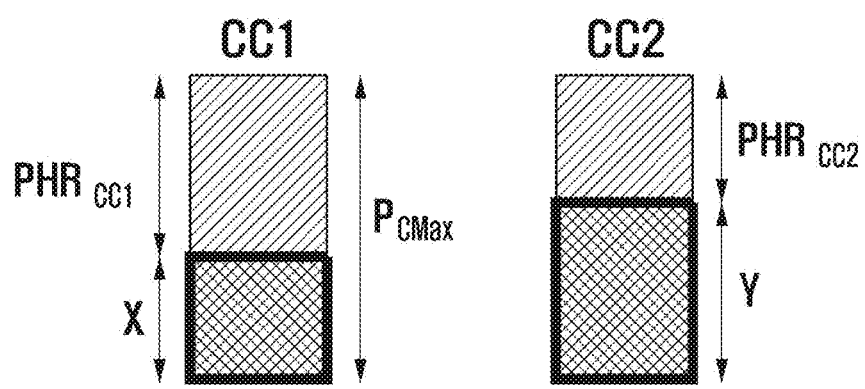
FIG. 1 illustrates explaining a method for the eNB to allocate additional power in a carrier aggregation environment according to various embodiments of the present disclosure.

FIGS. 1 through 12 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Detailed description of well-known functions and structures incorporated herein are omitted to avoid obscuring the subject matter of the present disclosure. This aims to omit unnecessary description so as to make the subject matter of the present disclosure clear.

For the same reason, some of elements are exaggerated, omitted or simplified in the drawings and the elements have sizes or shapes different from those shown in drawings, in practice. The same reference numbers are used throughout the drawings to refer to the same or like parts.

Advantages and features of the present disclosure and methods of accomplishing the same are understood more readily by reference to the following detailed description of exemplary embodiments and the accompanying drawings. The present disclosure is, however, embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowchart illustrations or block diagrams, and combinations of blocks in the flowchart illustrations or block diagrams, can be implemented by computer program instructions. These computer program instructions are provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks. These computer program instructions also are stored in a computer-readable memory that directs a computer or other programmable data processing apparatus to function in a particular manner, such that the instructions stored in the computer-readable memory produce an article of manufacture including instruction means that implement the function or act specified in the flowchart or block diagram block or blocks. The computer program instructions also are loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions or acts specified in the flowchart or block diagram block or blocks.

Furthermore, the respective block diagrams illustrates parts of modules, segments or codes including at least one or more executable instructions for performing specific logic function(s). Moreover, it should be noted that the functions of the blocks can be performed in different order in several modifications. For example, two successive blocks can be performed substantially at the same time, or can be performed in reverse order according to their functions.

The term "module" according to the embodiments of the disclosure, means, but is not limited to, a software or hardware component, such as a Field Programmable Gate Array (FPGA) or Application Specific Integrated Circuit (ASIC), which performs certain tasks. A module can advantageously be configured to reside on the addressable storage medium and configured to be executed on one or more processors. A module includes, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and modules can be combined into fewer components and modules or further separated into additional components and modules. In addition, the components and modules are implemented to execute one or more CPUs in a device or a secure multimedia card.

In cellular communication, a UE is power-constrained. The main contributor of the power consumption of the UE is uplink transmission.

The power required for uplink transmission to an eNB (or Base Station (BS)) is determined based on the pathloss observed by the UE. For example, the lower the pathloss to the eNB is, the smaller the transmit power of the UE to the eNB is. In certain embodiments, the higher the pathloss is, the larger the transmit power of the UE to the eNB is.

The power headroom of the UE is obtained by subtracting the power required for overcoming the pathloss observed by the UE from the maximum allowed transmit power of the UE.

For example, the transmission parameters for Modulation and Coding Scheme (MCS) and the transmission resource amount (such as a number of subcarriers of a normal OFDMA system) are determined by the eNB.

In order to configure the uplink (UL) transmission resources appropriately, the eNB needs to detect the power headroom of the UE available for the corresponding transmission for which the eNB has to configure resources and, otherwise, the required transmit power exceeds the power headroom of the UE.

In the cellular system, the UE notifies the eNB of the power headroom in order for the eNB to allocate resources to the UE appropriately based thereon.

Such a notification process is referred to as Power Headroom Report (PHR) in the 3rd Generation Partnership Project Long Term Evolution (3GPP LTE) standard.

The UE performs the PHR periodically of in an event-driven manner. For example, when the pathloss from the eNB changes more than a threshold, the UE transmits PHR.

The present disclosure is directed to the 3GPP LTE system. However, the present disclosure is not limited thereto, but can be applied to various types of cellular communication systems equally.

The PHR is calculated as equation (1).

$$PHR = P_{CMax} - P_{PUSCH} \qquad (1)$$

$P_{CMax}$ denotes maximum allowed transmission (Tx) power on the frequency of the serving cell and $P_{PUSCH}$ denotes the transmit power used for the last Physical Uplink Shared Channel (PUSCH) transmission.

The $P_{USCH}$ is the uplink shared data channel in LTE.

In the 3GPP LTE Release 10, the principle of Carrier Aggregation (CA) is introduced as a technique to increase the data rate by aggregating more than one carrier. In the CAS, each Component Carriers (CCs) cannot experience the other's pathloss and PHR is triggered per activated CC.

In certain embodiments, the UE reports the PHs on the respective activated carriers through one message as expressed by equation (2), which is called extended PHR.

$$PHR_c = P_{CMax\_c} - P_{PUSCH\_c} \qquad (2)$$

where 'c' denotes a given cell.

In certain embodiments, $P_{CMax\_c}$ is identical to other CCs.

In the above CA, since all of the CCs belong to the same eNB, the eNB checks the states of all CCs and allocates UL resources and parameters to the respective CCs based on the states. This is described with reference to FIG. 1.

FIG. 1 illustrates a method for the eNB to allocate additional power in a carrier aggregation environment.

Referring to FIG. 1, when the eNB intends to allocate additional resource 'Z' on CC1 and Y is greater than {PCmax−(X+Z)}, the eNB allocates [{PCmax−(X+Z)}−Y] on CC2.

The UE has the data to be transmitted to the UE and no uplink resources are allocated yet in the LTE system.

In certain embodiments, in order to notify the eNB of the presence of the uplink data, the UE sends the eNB a Buffer Status Report (BSR). The BSR includes data amount information. The eNB schedules the UE based on the BSR transmitted by the UE.

The eNB configures the periodic BSR to the UE.

In the 3GPP Rel-12, the conceptual idea of Dual Connectivity (DC) for simultaneous connection of the UE to a macro eNB (MeNB) and a pico cell is under discussion.

The main motive of the DC is to increase the data rate to the UE using a plurality of pico cells deployed within a hot spot. However, since the small sizes of the pico cells are likely to incur frequent handovers of the UE, the DC degrades the mobility robustness.

In order to overcome this problem, the conceptual idea of DC architecture in which an umbrella macrocell processes mobility.

In this new DC architecture, the UE is allocated uplink data channels to two eNBs simultaneously. The MeNB is considered as a controller for many control plane functions while the data, while the data plane function is performed by the respective eNBs independently.

The inter-eNB communication delay is much longer than the typical scheduling interval, because the inter-eNB communication has the delay of 2-60 ms, which is much longer than the scheduling delay of 1 ms.

In view of the UE, the eNBs performs scheduling independently such that two eNBs allocate the same subframe to the UE for uplink transmission. Also, the eNBs allocates different frequency resources (subcarriers) to the UE, because the eNBs performs resource allocation independently.

As aforementioned, no UE's PHR operation is specified in the DC environment yet. When the legacy PHR is used for the respective eNBs, the UE reports the PHs to the corresponding eNBs respectively.

In certain embodiments, each eNB schedules the UE without consideration of other eNB(s). Each eNB schedules the UE based on the eNB-specific maximum allowed power of the UE. Since the maximum allowed transmit power of the UE is limited, the total required transmit power exceeds the total maximum allowed transmit power of the UE in the above situation. This situation is described with reference to FIG. 2.

Figure 2:
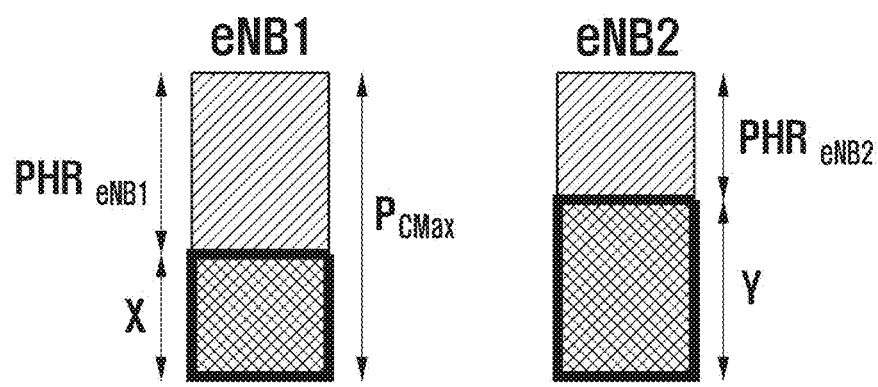
FIG. 2 illustrates a method for the eNBs schedule the same UE independently such that the total required transmit power exceeds the total maximum allowed transmit power of the UE in a wireless communication system supporting DC according to various embodiments of the present disclosure.

FIG. 2 illustrates a method for the eNBs schedule the same UE independently such that the total required transmit power exceeds the total maximum allowed transmit power of the UE in a wireless communication system supporting DC according to various embodiments of the present disclosure.

As shown in FIG. 2, the UE transmits a PHR to the eNB1 at the transmit power of $P_{CMax\_c}-X$ and transmits another PHR to the eNB2 at the transmit power of $P_{CMax\_c}-Y$. When both the eNBs 1 and 2 perform resource allocation to the UE based on the maximum PH, the total required transmit power of the UE is likely to exceed the UE's maximum allowed transmit power $P_{CMax\_c}$, such as $2*P_{CMax\_c}$.

Although not both the eNBs 1 and 2 schedule the UE based on the maximum PH, the total required transmit power is likely to exceed the UE's maximum allowed transmit power.

Although both the eNBs 1 and 2 allocates different frequency resources in the same subframe, since the uplink resource allocation is made across all OFDM symbols in the subframe, the above problems remain yet unsolved.

One of the simplest methods to solve the above problems is to divide the uplink transmit power of the UE into the transmit powers for the eNBs 1 and 2.

For example, part (X %) of the uplink transmit power is allocated for transmission to the eNB1, the rest (100−X) %) for transmission to the eNB2. The power distribution is designed such that the eNBs operate jointly and is configured by the eNB that controls operations of other participant eNBs.

Both the eNBs 1 and 2 scheduling the same UE on the resource overlapped in time is efficient. In certain embodiments, the eNB-specific powers are restricted in different subframes wasting transmit power. The detailed description thereof is made with reference to FIG. 3.

Figure 3:
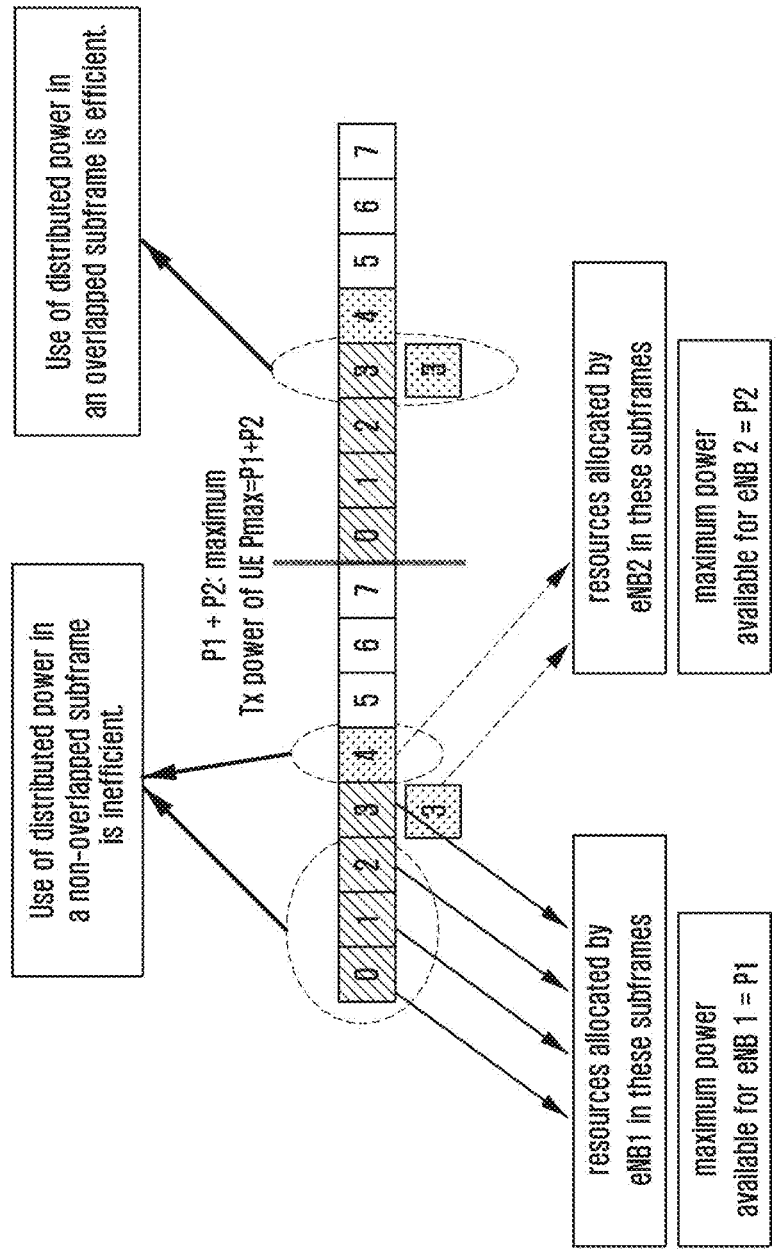
FIG. 3 illustrates a method for distributing uplink transmit power of the UE for eNBs 1 and 2 in all subframes according to various embodiments of the present disclosure.

FIG. 3 illustrates a method for distributing uplink transmit power of the UE for eNBs 1 and 2 in all subframes according to various embodiments of the present disclosure.

In FIG. 3, the eNB1 allocates resources to the UE in subframes 0, 1, 2, and 3. The eNB2 allocates resources to the UE in subframe 3 and 4.

In certain embodiments, P1+P2=P=UE's maximum allowed transmit power is assumed to apply to the above power distribution approach. The UE applies the reduced power P1 at subframes 0, 1, 2, and 3 and the other reduced power P2 at subframes 3 and 4.

In the above scenario, only one subframe fully applies the maximum allowed transmit power of the UE, i.e. subframe 3, in which both the eNBs 1 and 2 have allocated the resources to the UE. In subframe 0 when only the eNB1 has allocated resources to the UE, the UE applies only the reduced power P1 even though the maximum allowed transmit power is available, thereby reducing power utilization efficiency of the UE.

In order to solve this problem, a power scaling method reduces the transmit power according to predetermined rules when the total required uplink transmit power exceeds the maximum allowed transmit power.

For example, one eNB has a priority higher than that of the other. In certain embodiments, the arrival of the transmission to the corresponding eNB with the adjusted transmit power is difficult to guarantee. High reliability for dealing with the simultaneous subframe allocation of the two eNBs during a longer period (in time) is difficult to expect.

The present disclosure solves the above problem and aims to provide a method for controlling uplink transmit power of the UE efficiently in a wireless communication system supporting the dual connectivity.

In the following description, three methods of efficient uplink transmit power utilization of the UE are provided. The first method is UE assisted and network-initiated, the second method is network-initiated, and the third method is UE-initiated.

<First Method—UE-Assisted and Network-Initiated Transmit Power Control>

In the first method of the present disclosure, the UE reports to the second eNB the UL subframe allocation information, which is interchangeably referred to as UL allocation map, from the first eNB along with BSR. The second eNB performs subframe allocation to the UE in consideration of the UL allocation map of the first eNB to prevent the first and second eNBs from allocating the same subframe.

A description is made of the first method of the present disclosure hereinafter with reference to FIG. 4.

Figure 4:
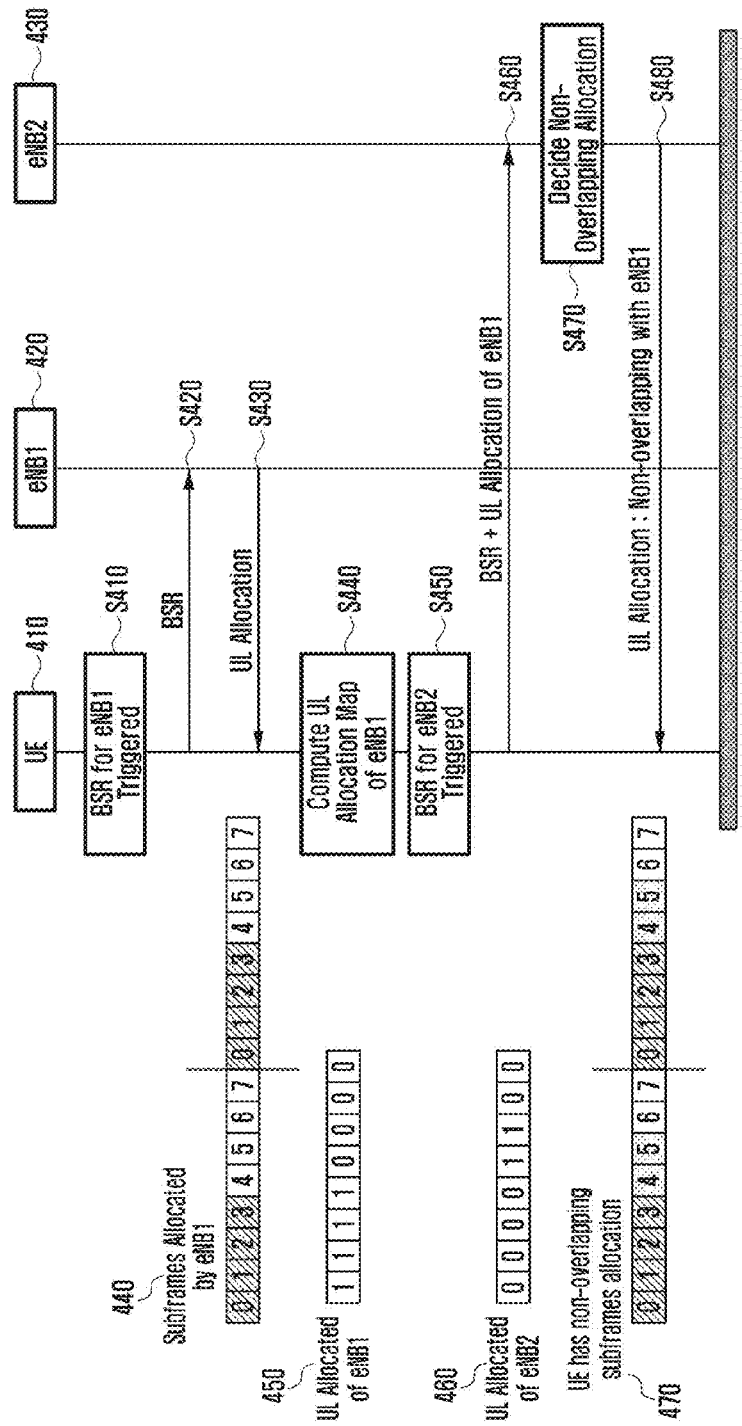
FIG. 4 illustrates a UL resource allocation method in a dual connectivity environment according to various embodiments of the present disclosure.

FIG. 4 illustrates a UL resource allocation method in a dual connectivity environment according to various embodiments of the present disclosure.

In step S410, the UE 410 detects the BSR for eNB1 420 is triggered. The BSR is transmitted to each eNB periodically or in an event-driven manner.

In step S420, the UE 410 transmits the BSR to the eNB1 420. In step S430, the eNB1 420 transmits to the UE 410 the UL resource allocation information.

The eNB1 420 allocates subframes 0, 1, 2, and 3 to the UE 410 as denoted by reference number 440 in FIG. 4.

In step S440, the UE 410 calculates and generates the UL allocation map for the eNB1 420. The detailed description thereof is made hereinafter.

The UE 410 generates the UL allocation map for the eNB1 420 in the form of a 8-bit bitmap {1, 1, 1, 1, 0, 0, 0, 0} in which the bits corresponding to the subframes allocated by the eNB1 420 are set to 1 and the rest bits are set to 0, as denoted by reference number 450. The UL allocation map for the eNB1 420 is exemplified in FIG. 6A.

The 8-bit bitmap is an exemplary case when one radio frame consists of 8 subframes in a wireless communication system including the UE 410, the eNB1 420, and the eNB2 430. When a radio frame consists of 10 subframes the UL allocation map consists of 10 bits.

In step S450, the UE 410 detects the BSR for eNB2 430 is triggered. For example, when it is necessary to transmit uplink data to the eNB2 430 (such as the UE 410 transmits higher layer data on the flow established with the eNB2 430), the UE 410 regards BSR as triggered.

In step S460, the UE transmits the UE allocation map for the eNB1 along with the BSR to the eNB2 430.

In step S470, the eNB2 430 allocates resources to the UE 410 in the subframes that are not reserved by the eNB1 420 by referencing the UL allocation map for the eNB1 420.

For example, the eNB2 430 allocates resources in the subframes 4 and 5 as denoted by reference number 460 in FIG. 4.

In step S480, the eNB1 420 and eNB2 430 allocate the subframe resources to the UE 410, as denoted by reference number 470, preventing the total required UL transmit power from exceeding the UE's maximum allowed transmit power.

According to various embodiments of the present disclosure, the UL allocation map of the UE 1 420 is transmitted to the eNB2 430 when updated to accomplish the object of the present disclosure. Since the UL HARQ operation is typically synchronized, the subframe allocation change does not occur frequently.

In the LTE system, the retransmission of HARQ process is scheduled periodically after every 8 subframes (Retransmit Time (RTT) and up to 8 HARQ processes are supported.

Although the frequency resources for the respective retransmissions changes, the subframes remain fixed. When the ongoing UL data buffer is empty and HARQ is not released, the HARQ process cannot be ended. The detailed description thereof is made with reference to FIG. 5.

Figure 5:
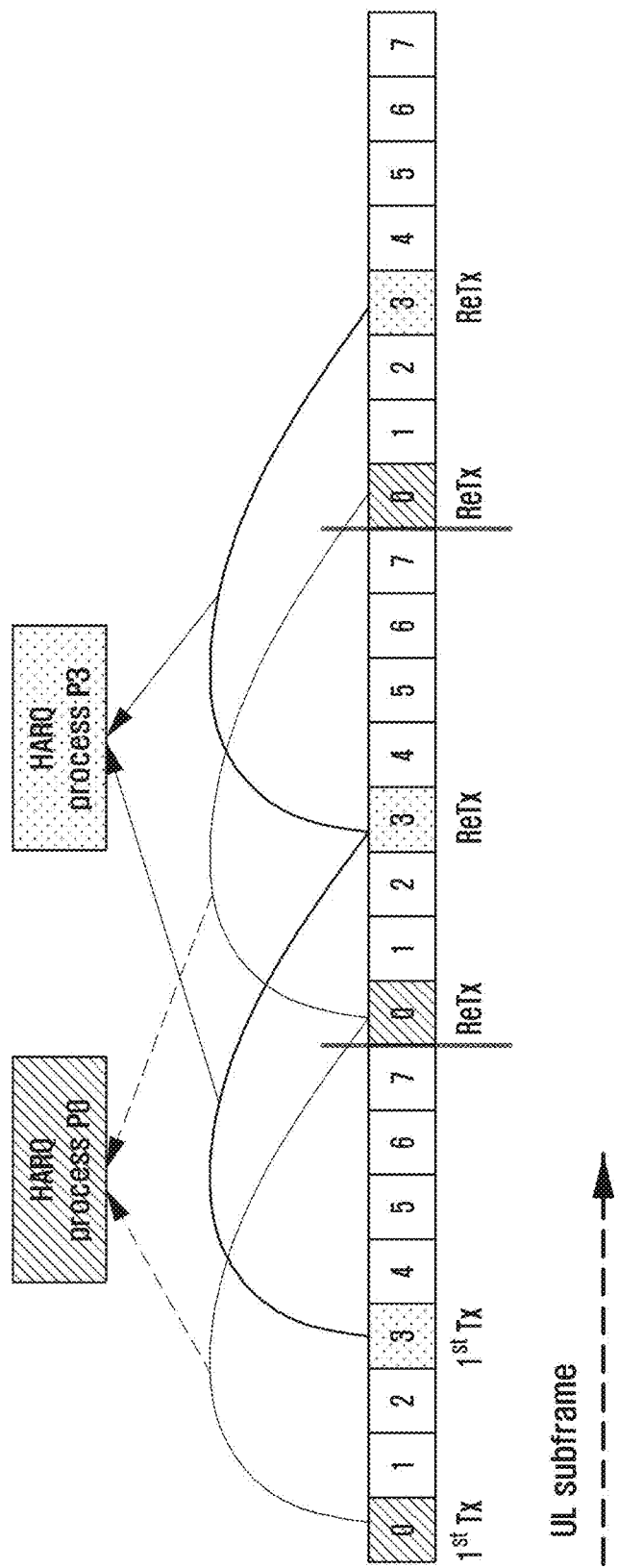
FIG. 5 illustrates exemplary synchronized UL HARQ processes according to various embodiments of the present disclosure.

FIG. 5 illustrates exemplary synchronized UL HARQ processes according to various embodiments of the present disclosure.

The UL allocation map shows the subframes occupied during the period of 8 subframes.

Although the two eNBs are not aligned on the same subframe level as the different HARQ processes P0 and P3 as shown in FIG. 5, when the eNBs detect the subframe offset, allocating resources without overlapping of the subframes between the eNBs is possible.

The subframe offset is exchanged between the eNBs through a backhaul. The UE calculates the subframe offset between the eNBs and adjusts the subframe offset such that the UL allocation map information corresponds to the subframe numbering used by the eNB during, for example, an 8-subframe RTT. The adjusted subframe offset information is provided to the eNB.

When the BSR is transmitted to the eNB, the UL allocation map is also transmitted to the eNB with the BSR. The UL allocation map is transmitted whenever the UL subframe allocation is updated by the eNB.

According to certain embodiments, the UE transmits the UL allocation map along with the BSR only when the UL allocation map is updated after the last BSR transmission.

According to another embodiment, when the UL allocation map is updated after the last BSR and the updated UL allocation map shows overlapping with the subframes allocated by another eNB, the UE transmits the updated UL allocation map to the eNB.

When the uplink subframe allocation is changed by the eNB and the updated UL allocation map shows overlapping with the subframes allocated by another eNB, the UE transmits the UL allocation map to the eNB.

The above-described options for triggering UL allocation map transmission is summarized as shown in table 1.

TABLE 1

Option A: along with BSR
   Option A1: whenever UE transmits BSR to eNB in dual connectivity environment
   Option A2: when BSR is triggered and UL allocation map is TABLE 1-continued updated since last BSR transmission
   Option A3: when BSR is triggered and the updated UL allocation has resources overlapped with resources allocated by another Enb
Option B: whenever UL allocation map is updated
   Option B1: whenever UL allocation from eNB changes
   Option B2: when changed UL allocation has resources overlapped with resources allocated by another eNB According to various embodiments, the UL allocation map is carried in a new field that is configured in the BSR.

Figure 6A:
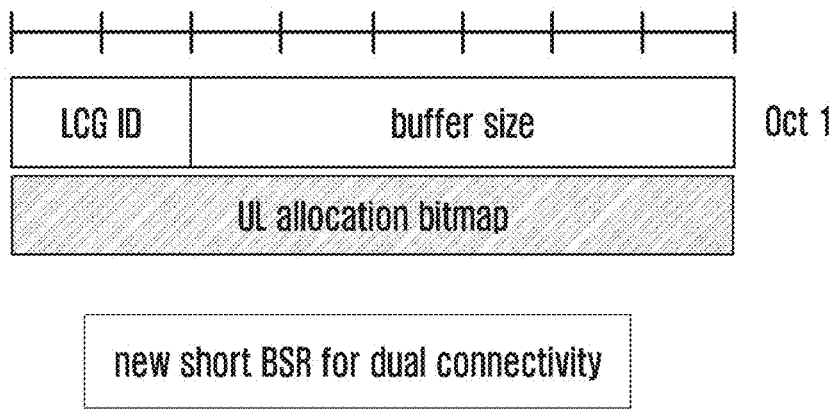
FIG. 6A illustrates a new BSR format according to various embodiments of the present disclosure.
Figure 6B:
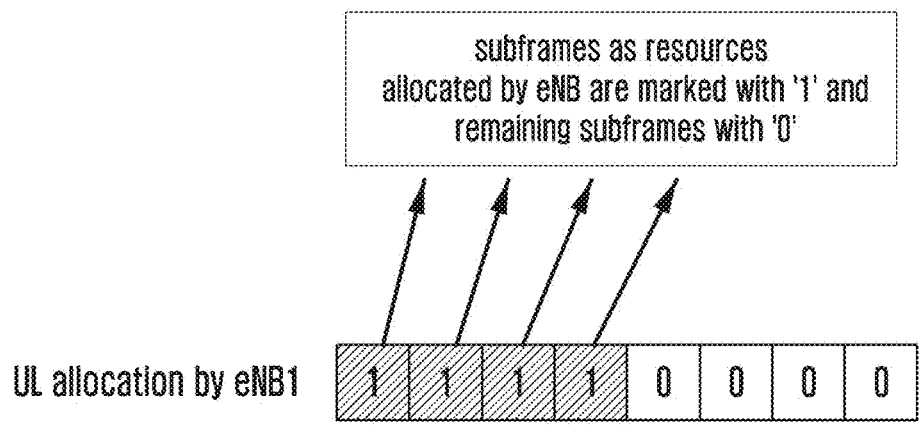
FIG. 6B illustrates a structure of the UL allocation map structure according to various embodiments of the present disclosure.

A reserved LCID value is used for BSR in various embodiments of the present disclosure. This is depicted in FIG. 6B.

According to certain embodiments of the present disclosure, a new MAC Control Element (CE) is introduced for transmitting the UL allocation map. In certain embodiments, the resources for transmitting the new MAC CE always have to be preoccupied for BSR resource allocation.

The UL allocation map transmission methods according to various embodiments of the present disclosure are summarized as shown in table 2.

TABLE 2

New type of BSR
   Include UL allocation map
   use reserved LCID value or consider having all BSRs follow above format in all DC situations
new MAC CE
   Option A: allocate resources for BSR
   Option B: include new transmission (excluding (ReTx)
both probabilities exist simultaneously Certain embodiments of the method proposed in FIG. 4 are described with reference to FIG. 7.

Figure 7:
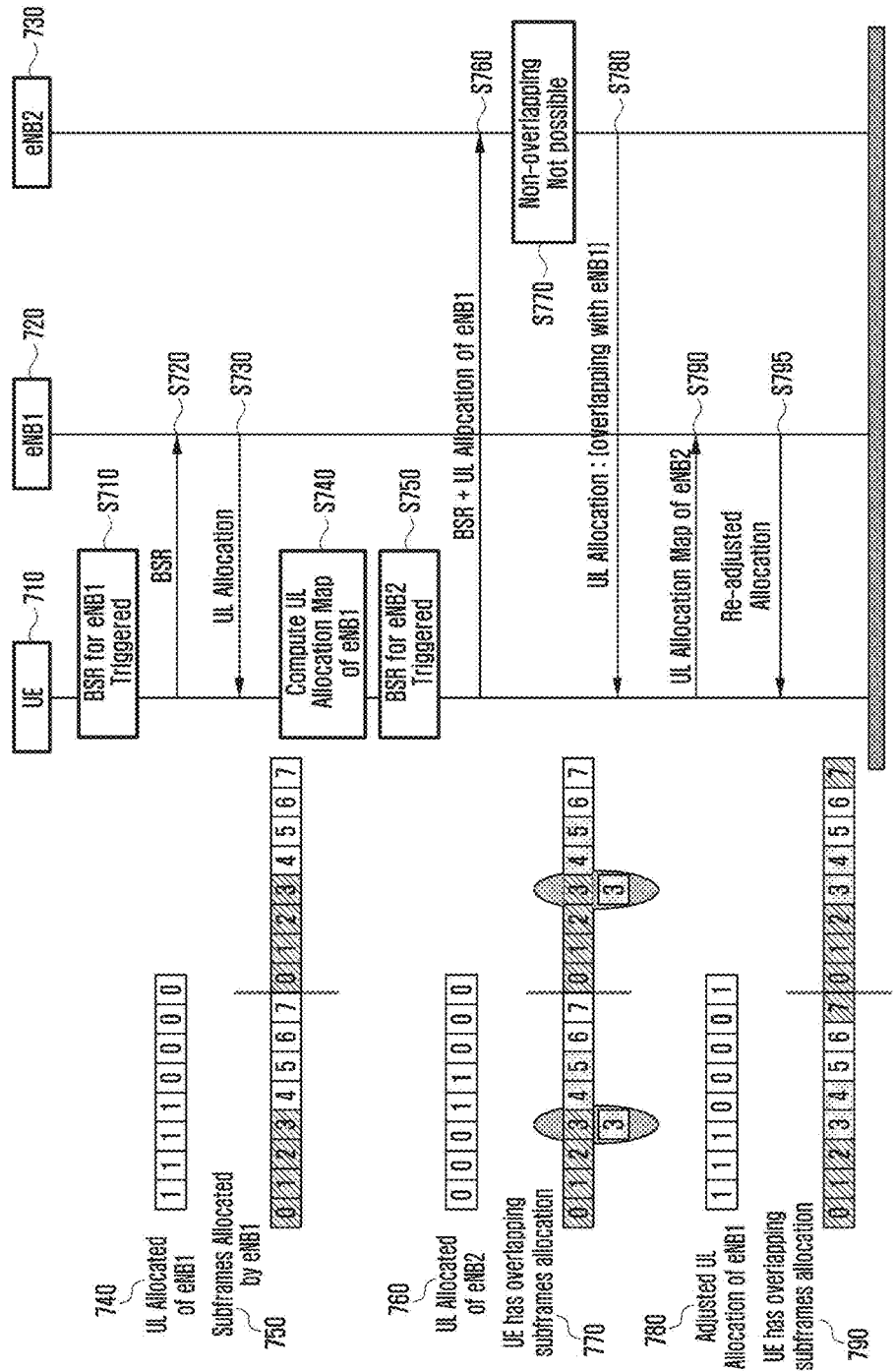
FIG. 7 illustrates signal flows among a UE and eNBs 1 and 2 in a UL resource allocation procedure according to various embodiments of the present disclosure.

FIG. 7 illustrates signal flows among a UE 710, eNB1 720 and eNB2 730 in a UL resource allocation procedure according to various embodiments of the present disclosure.

In FIG. 7, the resources that the eNB2 730 allocates overlap the resources that the eNB1 720 has allocated to the UE 710.

In certain embodiments, the UE 710 transmits the UL allocation map received from the eNB2 730 to the eNB1 720. The eNB1 720 attempts resource allocation adjustment to the corresponding subframe to avoid overlapped resource allocation.

For example, the eNB2 730 is in an overload state and, when allocating resources, overlaps resources allocated by the eNB1 720, which is not overloaded but in a state available for subframe reallocation. In certain embodiments, the eNB1 720 modifies its UL allocation map by referencing the UL allocation map of the eNB2 730.

A description thereof is made in detail with reference to FIG. 7.

In step S710, the UE 710 detects the BSR for eNB1 720 is triggered. In step S720, the UE 710 transmits the BSR to the eNB1 720. In step S730, the eNB1 720 transmits a UL resource allocation information to the UE 710.

The UE 710 computes the UL allocation map of the eNB1 720 at step S740. The eNB1 allocates the subframes 0, 1, 2, and 3 to the UE 710 as denoted by reference number 750 and thus the UL allocation map is generated based thereon as denoted by reference number 740. The bits corresponding to the subframes in which the UE 710 is allocated resources are set to 1, while the rest bits are set to 1.

In step S750, The UE 710 detects the BSR for the eNB2 730 is triggered. In step S760, the UE 710 transmits the BSR for the eNB2 730 and the UL allocation map of the eNB1 to the eNB2 730.

In step S770, when the BSR is received from the UE 710, the eNB2 730 determines whether it is possible to allocate resources without overlapping the resources allocated by the eNB1 720 by referencing the UL allocation map of the eNB1 720. In certain embodiments, the eNB2 730 allocates the resources that is overlapped with the resource allocated by the eNB1 720 in view of the resource allocation map of the eNB1 720.

In step S770, the eNB2 730 allocates the resources that overlap with the resources allocated by the eNB1 720. In step S780, the eNB2 730 transmits the UL resource allocation information to the UE 710.

As denoted by reference number 770, the eNB2 730 allocates the subframes 3 and 4 to the UE 710, meaning the eNB1 720 and the eNB2 720 allocate the subframe 3 to the UE simultaneously.

According to various embodiments of the present disclosure, when the UL resource allocation information is received from the eNB2 730, the UE 710 computes the UL allocation map of the eNB2 730.

The UE 710 compares the UL allocation map of the eNB1 720 and the UL resource allocation map of the eNB2 730 and detects the allocations of subframe 3 overlap.

In step S790, the UE 710 transmits the UL allocation map of the eNB2 730 to the eNB1 720. The eNB1 720 checks the allocated subframe 3 for overlapping and determines whether to readjust the resource allocation. In step S795, when readjustment is possible, the eNB1 720 substitutes the subframe 7 for the subframe 3 and notifies the UE 710 of the readjusted resource allocation.

The UL allocation map of the eNB1 720 is updated as denoted by reference number 780.

As denoted by reference number 790, the UE 710 allocates the resources from the eNB1 720 and the eNB2 730 without overlapping.

Readjusting the resource, as described above, affects the HARQ process.

When the subframe 7 is substituted for the subframe 3 as the resource allocated by the eNB1 720, the HARQ process for the subframe 3 changes. No method for changing the synchronized HARQ process has been proposed in the legacy system.

There is therefore a need of defining a HARQ process update procedure for resource readjustment. A subframe is assigned a HARQ process index, such as the HARQ process 3 corresponding to the subframe number 3.

In various embodiments of the present disclosure, the Packet Data Control Channel (PDCCH) or the Physical Downlink Control Channel (PDCCH) indicates the mapping between the legacy process and a new process explicitly.

The mapping is accomplished by adding two new fields to the PDCCH. One field indicating the current process and the other field indicating the new process replacing the current process.

A new Downlink Control Information (DCI) is defined for the mapping. The PDCCH including the DCI is transmitted to the UE in any subframe. Accordingly, the HARQ process change is applied with the DCI-based PDCCH transmission to the next subframe of the subframe carrying the PDCCH.

When the PDCCH is transmitted before the subframe corresponding to the current process, the transmission corresponding to the subframe of the current process is suspended. In certain embodiments, the suspended transmission is resumed in the subframe corresponding to the new process.

In certain embodiments of the present disclosure, the mapping from the current process to the new process is indicated by the PDCCH implicitly. For this purpose, the UL process number is added to the UL DCI.

The difference between the PDCCH-based explicit and implicit indications is the explicit indication of HARQ process change is made by a field newly defined in the PDCCH while the implicit indication of HARQ process change is made with a legacy field of the PDCCH.

When the UL process number mismatches the subframe number of the current process the process is mapped to the subframe corresponding to the process number indicated by the DCI.

In certain embodiments of the present disclosure, the process number is included in the DCI when necessary to indicate the mapping. The detailed description thereof is made with reference to FIG. 8.

Figure 8:
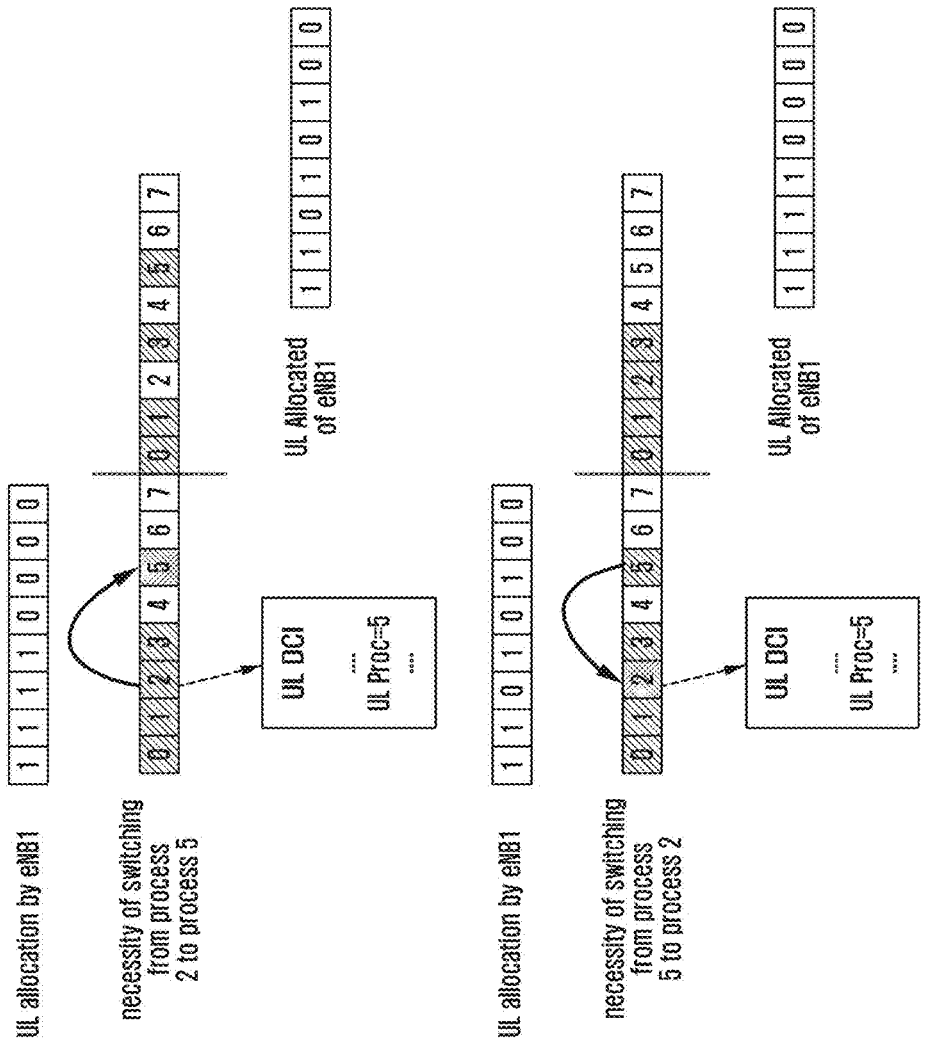
FIG. 8 illustrates an HARQ process change method according to various embodiments of the present disclosure.

FIG. 8 illustrates an HARQ process change method according to various embodiments of the present disclosure.

In FIG. 8, it is necessary to change the process number 2 to the process number 5. In certain embodiments, the DCI of the PDCCH indicates the process number 5 in the subframe 2. Accordingly, the UE transmits the packet in the subframe 5 instead of transmitting the packet scheduled in the process 2 at the subframe 2.

The description thereof is made in more detail hereinafter.

The PDCCH indicates the mapping of the HARQ process. For example, the HARQ number is notified to the UE using the UL DCI. According to the legacy standard, repeating retransmission at every 8 subframes is possible without extra mapping because the subframe number and the HARQ number match. The HARQ process is performed at the corresponding subframe. The method, according to various embodiments of the present disclosure, is applied when it is necessary to change the HARQ process number.

FIG. 8 is directed to an exemplary case of changing the HARQ process number 2 to the HARQ process number 5. While the HARQ process 2 is running, changing the process number is difficult. Accordingly, the retransmission at the subframe 2 is shifted to the subframe 5 in the frame. The retransmission of the HARQ process 2 is actually performed at subframe 5.

When it is necessary to change the process 5 to the process 2, the DCI of the PDCCH indicates the process number 2 in the subframe 5 and the UE transmits the packet in the subframe 2 in the next time, but not in the subframe 5.

In detail, when the HARQ process is not running, changing the HARQ process is possible. Accordingly, the retransmission is performed in the indicated subframe 5 instead of the current subframe 2. When no UL resource is allocated for such change, assuming that the indicated process 5 is not allocated adaptive resources is possible.

In certain embodiments, to change a high-number process to a low-numbered process, the UE monitors the subframe 2 that is not processed yet. When the PDCCH carrying the DCI for the UE that indicates the process 5 is transmitted, the UE detects the change from the process 5 to the process 2 and, when the packet is prepared, transmits the packet reserved to be transmitted in the subframe 5 using the subframe 2.

In certain embodiments, the mapping from the current process to the new process is indicated by a MAC CE, and a new MAC CE is defined to indicate the mapping from one process to another explicitly.

Along with the mapping indication, the start time is given explicitly or predefined. In certain embodiments, the predefined start time is 'x' RTT cycles after the receipt of the MAC CE indicating the mapping from the original process to a new process.

The options for indicating the mapping from the current HARQ process to a new HARQ process are summarized as shown in table 3.

TABLE 3

Option 1: based on MAC CE
    eNB ends colliding HLR process
    new process starts at newly allocated subframe
    MAC CE -1 Byte
    first 3 bits - original process
    next 3 bits - new process
    remaining 2 bits - reserved
    adoptability
        from next RTT cycle
        predefined
Option 2: PDCCH-based explicit mapping
    PDCCH provides explicit mapping between original process and new process
    DCI format is defined to have extra 6 bits
    first 3 bits - original process
    next 3 bits - new process
    PDCCH including this DCI is transmitted in any subframe
    is applied to next subframe corresponding to one of original and new processes
        Original process transmission is not performed
        Identical transmission is performed at subframe corresponding to new process
Option 3: PDCCH-based - implicit mapping
    PDCCH indicates mapping
    UL process number is added to UL DCI for this purpose
        when subframe corresponding to add UL process number mismatch subframe
corresponding to ongoing process,
            this means necessity of mapping (HARQ process change)
        when subframe corresponds to ongoing process
        when UL DCI includes process number
            when process number mismatches ongoing process
            process corresponding to current subframe is mapped to indicated process
                from next corresponding subframe
                transmission at current subframe is ignored
    when subframe mismatches ongoing process
        when UL DCI includes process number
            when process number matches ongoing process
    indicated process is mapped to process corresponding to current subframe.
    when new resources are not provided in current subframe
    assume indicated process is impossible to use adaptive resource <Second Method—Network-Initiated Transmit Power Control>

In the second method, the UL allocation map of the subframes allocated by the eNB1 is set to the eNB2 through the backhaul. In certain embodiments, the UE is connected to the eNBs 1 and 2 in the dual connectivity environment.

The eNB2 avoids allocating the subframe that has been allocated by the eNB1 already by referencing the UL allocation map received from the eNB1. Accordingly, the method according to the second method of the present disclosure makes it possible to solve the problem that the total required transmit power exceeds the UE's maximum allowed transmit power in the dual connectivity environment. The second method of the present disclosure is described in detail with reference to FIG. 9.

Figure 9:
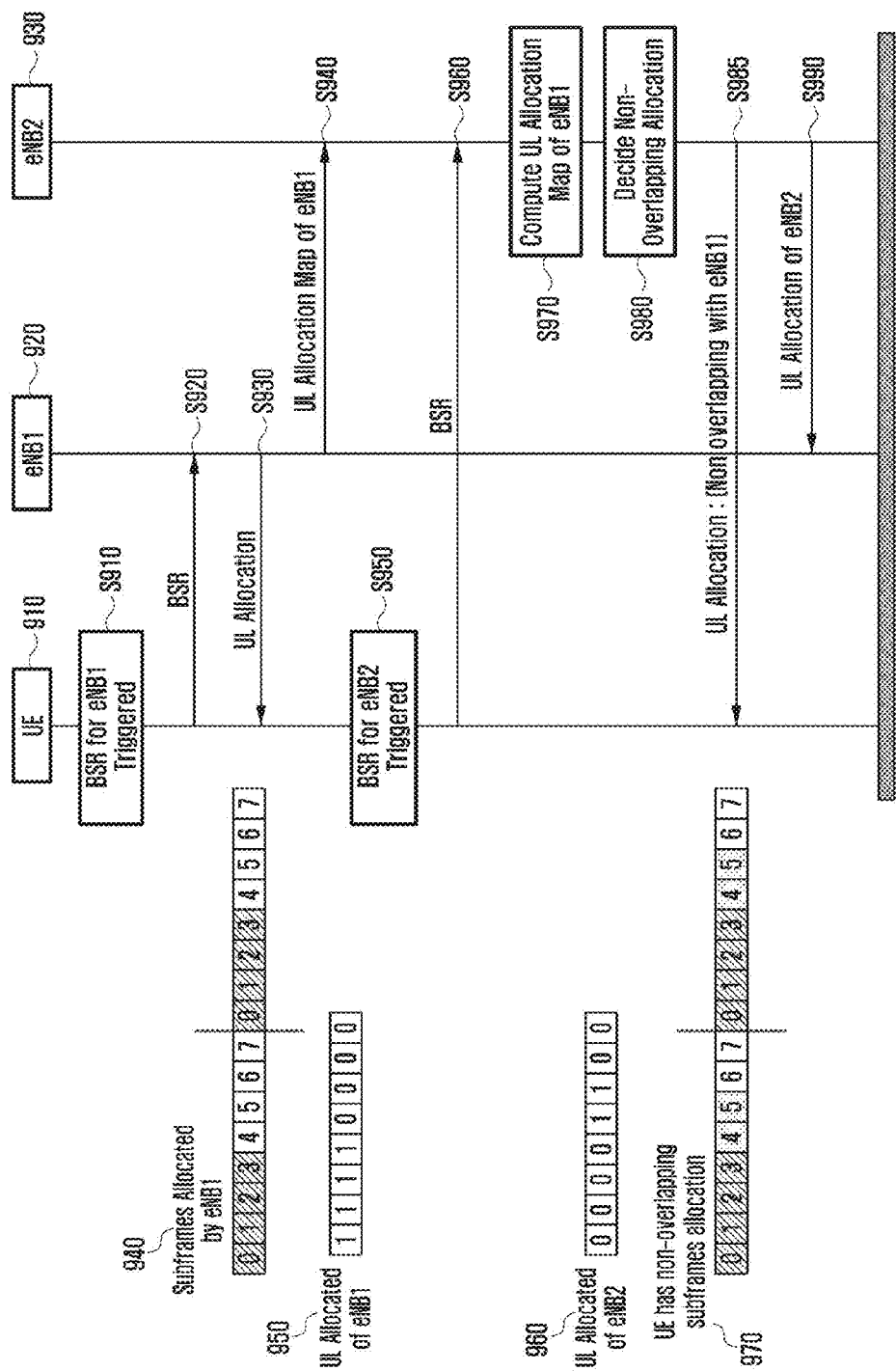
FIG. 9 illustrates signal flows among a UE and eNBs 1 and 2 in a UL resource allocation procedure according to various embodiments of the present disclosure.

FIG. 9 illustrates signal flows among a UE and eNBs 1 and 2 in a UL resource allocation procedure according to various embodiments of the present disclosure.

In step S910, the UE 910 detects the BSR for eNB1 920 is triggered. The BSR is transmitted to each eNB periodically or in an event-driven manner.

In step S920, the UE 910 transmits the BSR to the eNB1 920. In step S930, the eNB1 920 transmits to the UE 910 the UL resource allocation information. The eNB1 920 allocates subframe 0, 1, 2, and 3 to the UE 910 as denoted by reference number 940. The eNB1 920 generates the UL allocation map in the form of a bit map of 11110000 to inform of the subframe allocation as denoted by reference number 950.

In step S940, the eNB1 920 sends its UL allocation map to the eNB2 930 that participates in the dual connectivity. The UL allocation map of the eNB1 920 informs of the UL resource that the eNB1 920 has allocated to the UE 910.

In step S950, the UE 910 detects the BSR for the eNB2 930 is triggered. When necessary to transmit uplink data to the eNB2 930 (such as the UE intends to transmit higher layer data on the flow established with the eNB2), the UE regards BSR as triggered.

In step S960, the UE 910 transmits the BSR to the eNB2 930. In step S970, the eNB2 930 computes the UL allocation map of the eNB1 920. According to various embodiments of the present disclosure, when the eNB2 930 has already received the UL allocation map of the eNB1 920, a step of checking the UL allocation is substituted for this step.

In step S980, the eNB2 930 performs resource allocation by referencing the UL allocation map of the eNB1 920.

In step S985, the eNB2 930 transmits the UL resource allocation information to the UE 910. The UL resource allocation information indicates the allocated resources that are not overlapped with the UL resources allocated to the UE 910 by the eNB1 920. As denoted by reference number 960, the eNB2 930 allocates subframes 4 and 5 to the UE 910.

In step S990, the eNB2 930 transmits its UL resource allocation information to the eNB1 920.

The eNB1 920 and eNB2 930 allocate subframes to the UE 910, as denoted by reference number 970, such that the subframes allocated by the eNB1 920 and eNB2 930 are not overlapped with each other.

The UL allocation map is shared with other eNBs that have allocated resources to the UE 910.

When the eNB2 930 allocates resources to the UE 910 that the eNB1 920 allocates to the UE too because it is impossible to avoid duplicate resource allocation, the eNB2 930 notifies the eNB1 920 of the information on the resource allocation to the UE 910 through the backhaul using the UL allocation map. The eNB1 920 performs resource allocation adjustment to the UE 910 by referencing the UL allocation map of the eNB2 930 such that the subframes allocated by the two eNBs are not overlapped.

According to various embodiments of the present disclosure, the eNB2 930 inquires of the eNB1 920 for the information on the UL subframe allocation map before allocating resource to the UE 910. The eNB1 920 transmits its UL allocation map to the eNB2 930 such that the eNB2 930 performs resource allocation to the UE 910 by referencing the UL allocation map of the eNB1 920.

According to various embodiments of the present disclosure, the eNBs share their UL allocation maps with the counterpart eNB only when the resources they allocate to the UE 910 are overlapped.

According to various embodiments of the present disclosure, the eNBs may not share the UL subframe allocation map when there is no indication about the duplicate resource allocation of the two eNBs from the UE 910. The UL subframe allocation maps may not be shared between the eNBs when the UE 910 has power that is not enough for simultaneous transmission to the two eNBs. When the UL subframe allocation map is not shared between the two eNBs, the UE 910 transmits the UL subframe allocation map of one eNB to the other eNB.

<Third Method—UE-Initiated Transmit Power Control>

According to the third method of the present disclosure, the UE delays BSR transmission to the eNB2 while transmitting the BSR to the eNB1 to avoid simultaneous transmission.

According to various embodiments of the present disclosure, the network configures a new timer, such as BSR prohibit timer $T_{ProhibitBSR}$, to the UE. In certain embodiments, the UE starts the timer upon transmitting the BSR to an eNB. The UE holds transmission of the BSR to another eNB until the timer expires.

The network configures the timer per flow or a common timer for all flows.

According to certain embodiments of the present disclosure, the network configures a threshold of the data transmission degree for the eNB, which is capable of transmitting the BSR to the eNB2, to the UE in the middle of transmitting data to the eNB1. For example, the network configure the UE to hold transmitting the BSR to the eNB2 until X % of the data indicated by the previous BSR is transmitted to the eNB1. When the data transmitted to the eNB1 is equal to or more than X % of the data indicated by the BSR transmitted to the eNB1, the UE triggers BSR to the eNB2.

The threshold X denotes the remainder or transmission degree of the data being transmitted and is predefined or configured per UE by the network.

The network configures the threshold per flow or defines a common timer applicable to all the flows. For example, the threshold X is set to a large value for a high priority flow and a small value for a low priority flow.

The third method of the present disclosure is described in more detail with reference to FIG. 10.

Figure 10:
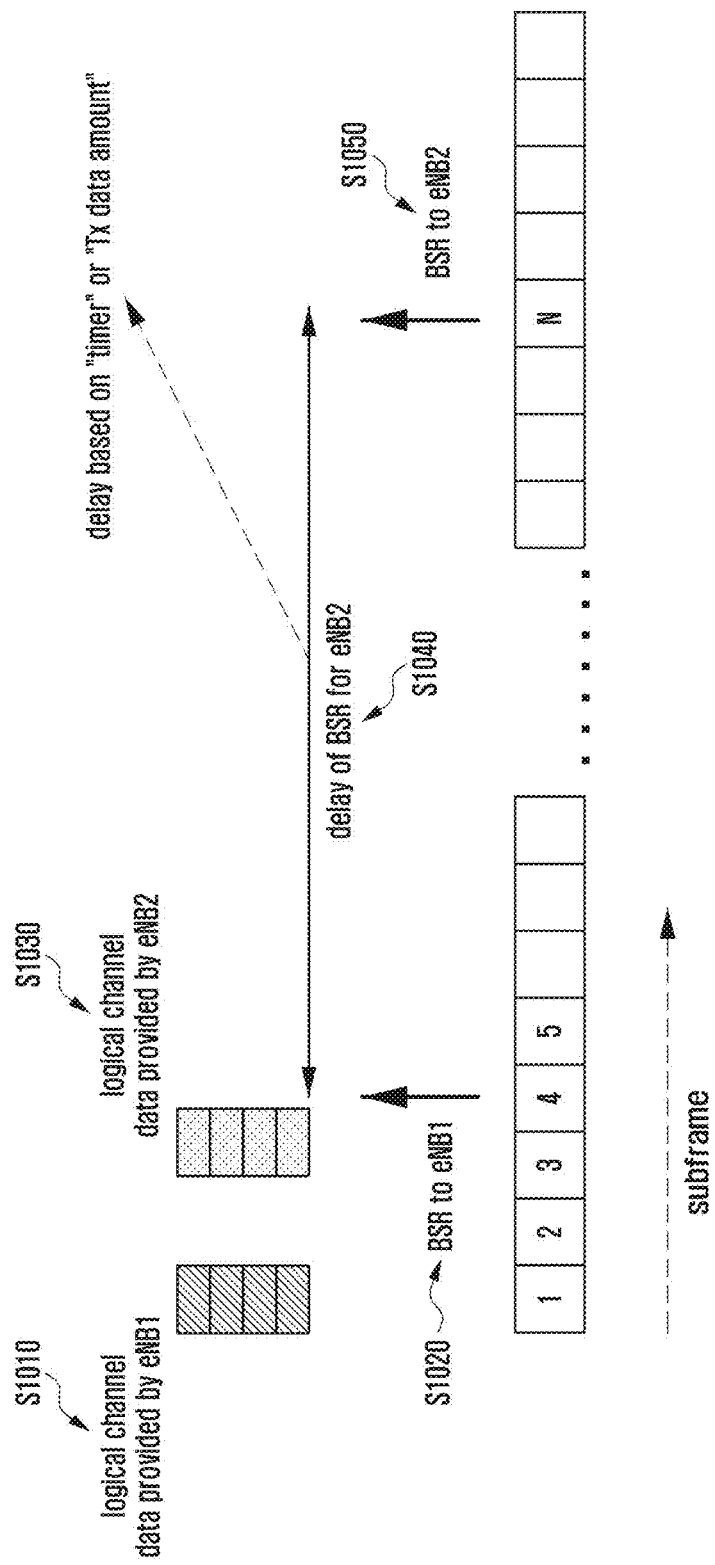
FIG. 10 illustrates a UL resource allocation method in a dual connectivity environment according to various embodiments of the present disclosure.

FIG. 10 illustrates a UL resource allocation method in a dual connectivity environment according to various embodiments of the present disclosure.

In step S1010, the UE detects that data to be served by the eNB1 occurs on the logical channel. The UE detects the occurrence of the data to be transmitted to the eNB1.

In step S1020, the UE sends the BSR to the eNB1.

In step S1030, the UE detects the occurrence of data to be served by the eNB2 on the logical channel. In step S1040, the UE delays triggering BSR to the eNB2 for a predetermined duration, other than immediately transmitting the BSR. The BSR transmission is delayed using the timer that the eNB (or network) has configured to the UE or based on the remainder (transmission degree) of the data being transmitted.

In step S1050, when the predetermined duration elapses, the UE transmits the BSR to the eNB2.

According to certain embodiments of the present disclosure, the network may not configure the BSR prohibit timer or the threshold X. In certain embodiments, the UE selects the BSR prohibit timer or the threshold X autonomously.

Using a combination of the BSR prohibit timer $T_{ProhibitBSR}$ and the threshold X is possible. For example, the timer $T_{ProhibitBSR}$ starts but the data transmission amount exceeds X %, the UE transmits the BSR to the eNB2 immediately and transmits the BSR when the $T_{ProhibitBSR}$ expires.

Figure 11:
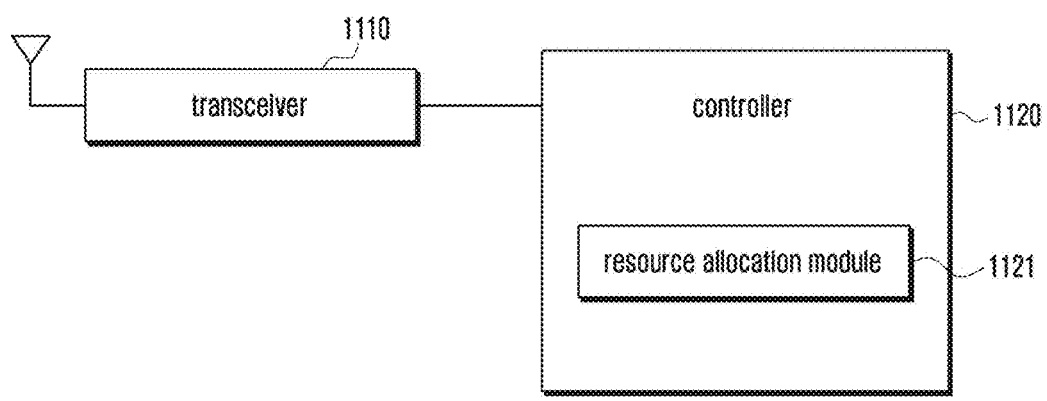
FIG. 11 illustrates a configuration the eNB according to various embodiments of the present disclosure.

FIG. 11 illustrates a configuration the eNB according to various embodiments of the present disclosure. As shown in FIG. 11, the eNB according to various embodiments of the present disclosure includes a transceiver 1110 and a controller 1120.

The transceiver 1110 receives a signal transmitted by a UE, transfers the signal to the controller 1120, and transmits the signal output by the controller 1120 to the UE.

The controller 1120 controls signal flows among the function blocks for the UE to operate according to various embodiments of the present disclosure.

The controller 1120 controls the transceiver 1110 to receive the UL allocation map information of another eNB that is generated based on the BSR for the eNB and the information on the UL resource allocated to the UE by the another eNB connected to the UE. The controller 1120 allocates UL resource to the UE based on the UL allocation map information and controls the transceiver 1110 to transmit the UL resource allocation information to the UE. According to various embodiments of the present disclosure, the resource allocation module 1121 is responsible for resource allocation.

In certain embodiments, the UL allocation map information is generated in the form of a bitmap.

The controller 1120 determines whether it is possible to allocate resource to the UE such that the allocated resource is not overlapped with the resource allocated by the first eNB. The controller 1120 allocates resource to the UE based on the determination result.

According to various embodiments of the present disclosure, the controller 1120 controls the transceiver 1110 to receive the UL resource allocation or UL allocation map information from another eNB to which the UE is connected.

According to various embodiments of the present disclosure, when the resource readjustment is performed, the controller 1120 determines whether HARQ process change is necessary and, when necessary, controls the transceiver 1110 to transmit the changed HARQ process information to the UE. In certain embodiments, the changed HARQ process information is transmitted to the UE through a MAC CE or PDCCH.

Figure 12:
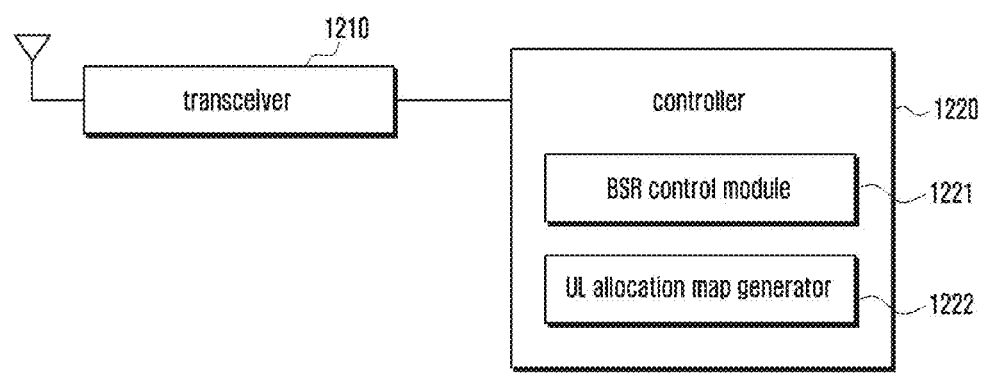
FIG. 12 illustrates a configuration of the UE according to various embodiments of the present disclosure.

FIG. 12 illustrates a configuration of the UE according to various embodiments of the present disclosure. As shown in FIG. 12, the UE according to various embodiments of the present disclosure includes a transceiver 1210 and a controller 1220.

The transceiver 1210 is responsible for receiving a signal transmitted by an eNB and transfers the signal to the controller 1220 and transmits the signal output by the controller 1220 to the eNB.

The controller 1220 controls signal flows among the function blocks for the UE to operate according to various embodiments of the present disclosure.

The controller 1220 controls the transceiver 1210 to receive the UL resource allocation information transmitted by the first eNB and generates UL allocation map information for the first eNB based on the received UL resource allocation information. When a BSR trigger for the second eNB is detected, the controller 1220 controls the transceiver to transmit the BSR for the second eNB and the UL allocation map information of the first eNB to the second eNB.

In certain embodiments, the UL allocation information is generated in the form of a bitmap.

The controller 1220 determines whether the UL resource allocation information of the first eNB is changed and, when the resource allocation information is changed, controls the transceiver 1210 to transmit the UL allocation map information corresponding to the changed UL resource allocation information to the second eNB.

The controller 1220 controls the transceiver 1210 to receive the UL resource allocation information from the second eNB and determines whether duplicate resource allocation occurs based on the UL resource allocation information received from the first eNB and the UL resource allocation information received from the second eNB. When duplicate resource allocation is detected, the controller 1220 controls the transceiver 1210 to transmit to the first eNB the UL resource allocation map corresponding to the UL resource allocation information received from the second eNB.

The controller 1220 also controls the transceiver 1210 to receive the readjusted UL resource allocation information from the first eNB. In certain embodiments, the readjusted UL resource allocation information of the first eNB indicates the resource that is not overlapped with the resource indicated by the UL resource allocation information received from the second eNB.

According to various embodiments of the present disclosure, the controller 1220 controls the transceiver to receive the control information including the information on the HARQ process corresponding to the readjusted UL resource allocation information and adjust the HARQ process based on the received control information. In certain embodiments, the control information is received through Physical Downlink Control Channel (PDCCH) or a MAC CE.

According to various embodiments, the controller 1220 includes a BSR controller that is responsible for BSR transmission and a UL allocation map generator 1222 that is responsible for generating and managing the UL allocation map.

The present disclosure is capable of preventing the UE from transmitting signals to two eNBs simultaneously so as to control the transmit power of the UE efficiently.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

For example, the HARQ process changes, according to various embodiments of the present disclosure, may not be performed along with the BSR transmission but separately.

As described above, the simultaneous transmission avoidance method and apparatus of the present disclosure are advantageous in terms of controlling the power of the UE by preventing the dual connectivity-enable UE from performing simultaneous transmission to two connected eNBs in a wireless communication system supporting the dual connectivity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a buffer status report (BSR) by a terminal connected to a first and a second base station in a wireless communication system supporting dual connectivity, the method comprising:
   receiving a first uplink resource allocation information from the first base station;
   generating information on an uplink resource allocation for the first base station based on the first uplink resource allocation information from the first base station;
   transmitting, when a BSR for the second base station is triggered, the information on the uplink resource allocation for the first base station and the BSR for the second base station to the second base station;
   receiving uplink resource allocation information from the second base station;
   determining whether a first uplink resource allocation of the first base station and a second uplink resource allocation of the second base station are overlapped based on the uplink resource allocation information from the second base station; and
   transmitting information on the second uplink resource allocation for the second base station corresponding to the uplink resource allocation information from the second base station to the first base station to readjust uplink resource allocation information, when the first uplink resource allocation and the second uplink resource allocation are overlapped.

2. The method of claim 1, wherein the information on the uplink resource allocation for the first base station is generated in a form of a bitmap.

3. The method of claim 1, further comprising:
   determining whether the first uplink resource allocation information from the first base station is changed; and
   transmitting, when the first uplink resource allocation information is changed, information on the changed uplink resource allocation for the first base station to the second base station.

4. The method of claim 1, further comprising receiving a readjusted uplink resource allocation information from the first base station, a third uplink resource of the first base station based on the readjusted uplink resource allocation information and the second uplink resource having no overlapped resources.

5. The method of claim 4, further comprising:
   receiving a control information including information on a Hybrid Automatic Repeat Request (HARQ) process corresponding to the readjusted uplink resource allocation information; and
   the HARQ process based on the control information.

6. The method of claim 5, where the control information is received through one of a Physical Downlink Control Channel (PDCCH) and a Medium Access Control (MAC) Control Element (CE).

7. A resource allocation method of a second base station in a wireless communication system supporting dual connectivity, the method comprising:
   receiving a buffer status report (BSR) and information on an uplink resource allocation for a first base station, the information on the uplink resource allocation, including information on a subframe allocated by the first base station to a terminal, for the first base station generated based on a first uplink resource allocation information of the first base station, from the terminal; and
   transmitting a second uplink resource allocation information, the second uplink resource allocation information being generated based on the information on the uplink resource allocation for the first base station, to the terminal,
   wherein the second uplink resource allocation information is used for determining whether a first uplink resource allocation of the first base station and a second uplink resource allocation of the second base station are overlapped by the terminal, and when the first uplink resource allocation and the second uplink resource allocation are overlapped, the terminal transmits, information on the second uplink resource allocation for the second base station corresponding to the second uplink resource allocation information, to the first base station to readjust uplink resource allocation information.

8. The method of claim 7, wherein the information is generated in a form of a bitmap.

9. The method of claim 7, further comprising:
determining whether the second base station allocates resources without overlapping resources the first base station allocates to the terminal based on the information on the uplink resource allocation for the first base station; and
allocating the resources to the terminal based on a result of the determination.

10. A terminal configured to transmit a buffer status report (BSR) that is connected to a first base station and a second base station in a wireless communication system supporting dual connectivity, the terminal comprising:
a transceiver configured to transmit and receive signals to and from the base stations; and
a controller configured to:
control the transceiver to receive a first uplink resource allocation information from the first base station,
generate information on an uplink resource allocation, including information on a subframe allocated by the first base station to the terminal, for the first base station based on the first uplink resource allocation information from the first base station,
control the transceiver to transmit, when the BSR for the second base station is triggered, the information on the uplink resource allocation for the first base station and the BSR for the second base station to the second base station,
control the transceiver to receive uplink resource allocation information from the second base station;
determine whether a first uplink resource allocation of the first base station and a second uplink resource allocation of the second base station are overlapped based on the uplink resource allocation information from the second base station; and
control the transceiver to transmit, information on the second uplink resource allocation for the second base station corresponding to the uplink resource allocation information from the second base station to the first base station to readjust uplink resource allocation information, when the first uplink resource allocation and the second uplink resource allocation are overlapped.

11. The terminal of claim 10, wherein the information on the uplink resource allocation for the first base station is generated in a form of a bitmap.

12. The terminal of claim 10, wherein the controller is further configured to:
determine whether the first uplink resource allocation information from the first base station is changed; and
control the transceiver to transmit, when the first uplink resource allocation information is changed, information on the changed uplink resource allocation for the first base station to the second base station.

13. The terminal of claim 10, wherein the controller is further configured to control the transceiver to receive a readjusted uplink resource allocation information from the first base station, a third uplink resource of the first base station based on the readjusted uplink resource allocation information and the second uplink resource having no resources.

14. The terminal of claim 13, wherein the controller is further configured to:

control the transceiver to receive a control information including information on a Hybrid Automatic Repeat Request (HARQ) process corresponding to the readjusted uplink resource allocation information; and
adjust the HARQ process based on the control information.

15. The terminal of claim 14, wherein the control information is received through one of a Physical Downlink Control Channel (PDCCH) and a Medium Access Control (MAC) Control Element (CE).

16. A second base station configured to allocate resources to a terminal in a wireless communication system supporting dual connectivity, the second base station comprising:
a transceiver configured to transmit and receive signals to and from the terminal; and
a controller configured to:
control the transceiver to receive a buffer status report (BSR) and information on an uplink resource allocation for a first base station, the information on the uplink resource allocation, including information on a subframe allocated by the first base station to the terminal, for the first base station being generated based on a first uplink resource allocation information of the first base station, from the terminal, and
control the transceiver to transmit a second uplink resource allocation information, the second uplink resource allocation information being generated based on the information on the uplink resource allocation for the first base station, to the terminal,
wherein the second uplink resource allocation information is used for determining whether a first uplink resource allocation of the first base station and a second uplink resource allocation of the second base station are overlapped by the terminal, and when the first uplink resource allocation and the second uplink resource allocation are overlapped, the terminal transmits, information on the second uplink resource allocation for the second base station corresponding to the second uplink resource allocation information, to the first base station to readjust uplink resource allocation information.

17. The second base station of claim 16, wherein the information is generated in a form of a bitmap.

18. The second base station of claim 16, wherein the controller is further configured to:
determine whether the second base station allocates resources without being overlapped with resources the first base station allocates to the terminal, based on the information on the uplink resource allocation for the first base station; and
allocate resources to the terminal based on a result of the determination.

19. A method for a first base station to control Hybrid Automatic Repeat Request (HARQ) processes of a terminal in a wireless communication system, the method comprising:
receiving uplink resource allocation information of a second base station from the terminal;
determining whether a first uplink resource of the first base station and a second uplink resource of the second base station are overlapped, based on the uplink resource allocation information;
determining, when the first uplink resource of the first base station and the second uplink resource of the second base station are overlapped, to change the HARQ process;

generating a control information for changing the HARQ process of the terminal; and transmitting the control information to the terminal.

20. The method of claim 19, wherein the control information is received through one of a Physical Downlink Control Channel (PDCCH) and a Medium Access Control (MAC) Control Element (CE) and when the control information is transmitted through the PDCCH, further comprising:

configuring a field indicating the HARQ process and a field indicating a target HARQ process in the PDCCH; and transmitting the PDCCH to the terminal, and when the control information is transmitted through the PDCCH, further comprising:

generating an Uplink (UL) Downlink Control Information (DCI) including information on the HARQ process of the UE that is to be changed; and transmitting the PDCCH including the UL DCI to the terminal.

21. A first base station configured to control a Hybrid Automatic Repeat Request (HARQ) process of a terminal in a wireless communication system, the first base station comprising:

a transceiver configured to transmit and receive signals to and from the terminal; and a controller configured to:

control the transceiver to receive uplink resource allocation information of a second base station from the terminal;

determine whether a first uplink resource of the first base station and a second uplink resource of the second base station are overlapped, based on the uplink resource allocation information;

determine, when the first uplink resource of the first base station and the second uplink resource of the second base station are overlapped, to change the HARQ process;

generate a control information for adjusting the HARQ process of the terminal; and control the transceiver to transmit the control information to the terminal.

22. The first base station of claim 21, wherein the control information is received through one of a Physical Downlink Control Channel (PDCCH) and a Medium Access Control (MAC) Control Element (CE), wherein the controller is further configured to:

configure, when the control information is transmitted through the PDCCH, a field indicating the HARQ process and a field indicating a target HARQ process in the PDCCH; and transmit the PDCCH to the terminal, and wherein the controller is further configured to:

generate, when the control information is transmitted through the PDCCH, an Uplink (UL) Downlink Control Information (DCI) including information on the HARQ process of the UE that is to be changed; and control the transceiver to transmit the PDCCH including the UL DCI to the terminal.

* * * * *